United States Patent Office 3,083,089
Patented Mar. 26, 1963

3,083,089
GRANULAR HERBICIDAL COMPOSITION AND METHOD
Victor Renner, Marysville, Ohio, assignor to The O. M. Scott & Sons Company, Marysville, Ohio, a corporation of Ohio
No Drawing. Filed July 6, 1959, Ser. No. 824,953
19 Claims. (Cl. 71—2.4)

This invention relates to herbicides, and more particularly to herbicidal formulations for the control of undesirable grasses and weeds found among turf grasses.

This application is a continuation-in-part of applicant's copending applications Serial Nos. 634,922, filed January 18, 1957, and 660,452, filed May 21, 1957, both now abandoned. Application Serial No. 634,922 is a continuation of applicant's application Serial No. 172,679, filed July 8, 1950, and applicant's application Serial No. 585,270, filed May 16, 1956, the latter of which was a continuation-in-part of said application Serial No. 172,679 and both of which are now abandoned. Application Serial No. 660,452 is also a continuation-in-part of said application Serial No. 172,679.

Various dry formulations of herbicide compositions for controlling noxious plants have been tried heretofore. However, such prior dry formulations have some serious shortcomings and present numerous problems. In particular, the dry herbicidal formulations heretofore used have presented a serious dust problem because substantial quantities of fines or dust are raised from the herbicide formulation when it is applied. (Dust has been defined as all solid particles capable of being suspended in the air, usually from 1–150 microns in diameter.) Such prior herbicide compositions usually contain as an active ingredient some chemical compound, like arsenic, phenylmercuric or 2,4-dichlorophenoxy acetic acid, which is toxic to humans and other mammals, so that dust arising from the herbicide formulations during their application may have harmful effects. In fact, in some states it is unlawful to use or sell dry formulations of certain herbicidal compositions which contain dust. Furthermore, the fines or dust of prior dry herbicidal formulations float in the air currents and drift onto adjoining vegetation such as garden crops and flowers, so that such prior dry formulations cannot be safely applied on home lawns or other areas adjacent desirable plants which may be adversely affected by the herbicide.

Another problem not only with prior dry herbicide formulations but with herbicides in the form of solutions (i.e., sprays) is that the active ingredient of the herbicide is rapidly removed from the carrier by wind action, or leaching by rain or soil water, so that the active herbicide ingredient is not in contact with the treated plant as long as it should be to be fully effective. A related problem, particularly in prior formulations for clover control, is that the active ingredient is often too readily leached from the carrier to the root zone of desirable woody plants bordering the lawn area and injures such plants. Also, herbicides as used in the above forms have been found to seriously discolor the surrounding turf grass as they fall alike on undesirable growths and turf grass.

Still another disadvantage of some prior dry formulations is that they are not free-flowing and thus cannot be easily applied in desired controlled quantities by mechanical means like conventional lawn spreaders.

Accordingly, it is a principal object of the present invention to provide a dry herbicide composition especially suited for selective control of noxious weeds and the like which is free-flowing and substantially dust-free.

Other objects of the instant invention are to provide a dry herbicide composition especially suited for selective control of noxious weeds and the like:

(1) In which the herbicidally active ingredient is bonded to the surfaces of a dry carrier by adsorption, virtually eliminating release of toxic dusts during application;

(2) In which substantially all of the herbicidally active ingredient is firmly bonded to a dry, granular carrier by adsorption so that said active ingredient is not quickly removed by wind action, or rain or soil water leach, and therefore is in contact with the treated plants for longer, more effective periods of time;

(3) In which the herbicidally active ingredient is substantially resistant to soil water leach so that no substantial injury results to roots of woody plants adjacent the treated area, nor to woody roots close to the soil in the treated area;

(4) Which is free-flowing so that it can be easily applied in controlled quantities by such means as conventional lawn spreaders; and (5) Which comprises a dry, granular carrier of finely divided expanded vermiculite having an herbicidal compound and a low-volatile organic solvent firmly adsorbed on the surfaces thereof.

It is another principal object of the present invention to provide a new and improved method of making the novel granular vermiculite carrier herbicides of applicant's invention to impart to them the characteristics that achieve the aforementioned objects and advantages. More especially, it is an object of the present invention to provide novel methods of making herbicides and to achieve improved herbicides thereby in which:

(6) A herbicidally active compound, either dissolved or emulsified in a suitable vehicle therefor, is added to finely divided expanded vermiculite in granular form, the quantities of ingredients being such that substantially all of the herbicidally active compound is bonded by adsorption to the platelets of the vermiculite; and (7) Synergistic effects are obtained from the use of N-1-naphthyl phthalamic acid in combination with phenylmercuric compounds.

These and other objects of the invention will become more fully apparent from the following description, discussion and appended claims.

It has been discovered that when a solution [1] of a herbicidally active ingredient and a suitable solvent therefor is properly coated on granular, finely divided expanded vermiculite so that substantially all of the herbicidal compound becomes firmly adsorbed on the surfaces of the vermiculite, the result will be a formulation which is dust-free and from which the active ingredient will be only slowly leached from the vermiculite. This phenomenon is in sharp contradistinction to prior art methods in which a solid carrier material has been literally soaked with a herbicidal composition, resulting not only in small quantities of adsorbed herbicidal compound but also in large quantities of adsorbed herbicidal compound retained within the voids of the expanded vermiculite particles and which is relatively quickly leached from said solid carrier, resulting in ineffective weed control and in a formulation which is difficult to handle.

In accordance with this invention, a preselected herbicidally active ingredient is added to a solvent therefor, the herbicidal compound being present in an amount sufficient to be toxic to selected plants and the solvent being used at least in a quantity sufficient to dissolve (or to emulsify) the herbicide. The relative quantities of in-

---

[1] "Solution" and "dissolve," when used in the specification and claims, shall also be construed to include "emulsion" and "emulsify," respectively; the word "vehicle" when used in the specification and claims shall be construed to denote a substance in which the herbicidal or phytocidal compound may be dissolved or emulsified.

gredients should be such that substantially all the herbicide will be adsorbed on the surfaces of the vermiculite. The resulting solution (or emulsion) is then sprayed substantially uniformly onto granular, finely divided expanded vermiculite in an amount at least sufficient to provide the toxic concentration required for the service for which the composition is intended. After the vermiculite has been sprayed, the resulting composition is thoroughly mixed to obtain a homogeneous-appearing mass.

The granular composition is readily spread on lawn or turf infested with noxious weeds, using conventional lawn fertilizer or seed spreaders. After one to four weeks, the destruction of the weeds and the growth of new turf grass is noticeably evident.

Numerous herbicides may be used in the instant herbicidally active compositions, the choice depending largely upon the purpose for which the composition is being used. For example, where it is desired to eliminate crabgrass, the primary toxic ingredient of the composition will be a phenylmercuric compound; when the growth to be eradicated is clover, haloaryloxy substituted aliphatic acids and their esters are preferable; etc. Aside from the requirement that the herbicide be toxic to the particular growth to be eradicated, the primary limitation on the choice of herbicidally active ingredient is that said ingredient must be either substantially soluble or emulsifiable in the particular solvent used as a vehicle and must be capable of being adsorbed on the surfaces of the expanded vermiculite. Unless the herbicidally active ingredients possess the foregoing characteristic, they will not be adsorbed on the vermiculite but will, at best, be "stuck" onto the vermiculite surfaces (as in copending application Serial No. 659,486, filed May 16, 1957, now abandoned), and will be leached from the vermiculite at a much faster rate than would be desirable for the uses here contemplated. In general, the preferred herbicidally active ingredients used in the instant invention may be broken down into two groups:[2]

(1) Group I includes the following compounds, broken down by the use to which they will be put:

(a) For crabgrass control, phenylmercuric compounds, such as the hydroxide or salts of aliphatic acids, are preferable. Other toxic ingredients may also be present, such as the reaction product of the solvent with phenylmercuric compounds. In addition, acids such as propionic, naphthyl phthalamic acid and other acids may be added to form phenylmercuric compounds. Examples of the compounds which have been found particularly useful are phenylmercuric hydroxide, oleate, acetate, propionate, butyrate, amylate, hexanoate, and stearate.

(b) For clover control, preferred compounds include 2,4,5-trichlorophenoxyacetic acid;
TBA (2,4,6-trichlorobenzoic acid);
Endothal (disodium-3,6-endoxohexahydrophthalic acid);
2,3,6-trichlorophenylacetic acid;
o-chlorophenoxyacetic acid;
2,4,6-trichlorophenoxyacetic acid;
pentachlorophenoxyacetic acid;
2-(2,4,5-trichlorophenoxy) propionic acid;
2,4-dibromophenoxyacetic acid;
2,4,6-tribromophenoxyacetic acid;
p-iodophenoxyacetic acid;
4-chloro-o-toloxyacetic acid;
4-chloro-m-toloxyacetic acid;
4-chloro-2-ethylphenoxyacetic acid; and
4-chloro-3,5-dimethylphenoxyacetic acid.

(c) For broadleaf weed control, one may use 2,4-dichlorophenoxyacetic acid;
2,3,6-trichlorophenylacetic acid;
IPC (isopropyl phenylcarbamate);
CIPC (chloroisopropyl phenylcarbamate);
2,4,6-trichlorobenzoic acid;
o-chlorophenoxyacetic acid;
2,4,6-trichlorophenoxyacetic acid;
2,3,4,6-tetrachlorophenoxyacetic acid;
2-(2,4,5-trichlorophenoxy) propionic acid;
p-bromophenoxyacetic acid;
2,4-dibromophenoxyacetic acid;
2,4,6-tribromophenoxyacetic acid;
p-iodophenoxyacetic acid;
p-fluorophenoxyacetic acid;
2,4-di-fluorophenoxyacetic acid;
4-chloro-o-toloxyacetic acid;
4-chloro-m-toloxyacetic acid;
4-chloro-2-ethylphenoxyacetic acid;
4-chloro-3,5-dimethylphenoxyacetic acid;
2-chloro-1-naphthoxyacetic acid;
2,4-dichloro-1-naphthoxyacetic acid; and
α-(2-chloro-1-naphthoxy)-propionic acid.

(d) For grassy weed control, trichloroacetic acid; 2,2-dichloropropionic acid; IPC; and CIPC may be used.

(2) Group II includes the following compounds, broken down by use to which they will be put:

(a) For crabgrass control, preferable compounds include chlordane[3] (60% octachloro-4,7-methano tetrahydroindane [$C_{10}H_6Cl_8$] and 40% related compounds); and Neburon (Du Pont's trademark for 1-n-butyl-3-[3,4-dichlorophenyl]-1-methylurea).

(b) For clover control, the following compounds are useful: 2,4,5-trichlorophenoxyacetic acid; 2,4,6-trichlorobenzoic acid; and 2,3,6-trichlorophenylacetic acid.

(c) For general broadleaf weed control, preferred compounds include 2,4-dichlorophenoxyacetic acid; 2,3,6-trichlorophenylacetic acid; IPC; CIPC; and 2,4,6-trichlorobenzoic acid.

(d) For grassy weed control, pentachlorophenol and hexachloroacetone may be used.

In addition to the above-listed herbicides, group II herbicides also include esters of the haloaryloxy aliphatic acids set forth in group I, such as the methyl, ethyl, isopropyl, butyl, pentyl, propylene, glycol, butyl ether, butoxy ethanol, isooctyl, tetrahydrofurfuryl, butoxyethoxypropyl, and other esters. Generally speaking, these esters have the same uses as the respective acids from which they are derived. Haloaryloxy derivatives of higher aliphatic acids and the corresponding haloaryloxy derivatives of such unsaturated aliphatic acids as acrylic acid and its homologues may also be used.

Of the foregoing compounds, the phenylmercurics, haloaryloxy substituted aliphatic acids and esters and chlordane have to date proved to be the most effective herbicides in actual test results for the types of control above indicated.

Solvents usable in the instant invention may include any material which is readily adsorbed on the surfaces of expanded vermiculite and in which the selected herbicidally active material may be either dissolved or emulsified. The solvent selected preferably should have low volatility to prevent its ready evaporation under outdoor conditions of use and, since all solvents are at least somewhat toxic and, for the most part, have only a limited degree of selectivity, should not be used in a concentration or amount such as to impair the toxic selectivity of the overall formulation. If a quick release of the herbicidally active ingredient is desired, the solvent should be hygroscopic to speed dissolution of the herbicide under moist conditions.

---

[2] The purpose of dividing the herbicidally active ingredients into two groups is to classify them depending upon the solvents with which they are used, as will be more fully discussed infra. It is to be understood, however, that the usable herbicides are not to be limited to those recited, but may include others which meet the general requirements mentioned above, including derivatives, isomers, and other compounds which are similarly toxic to the recited compounds.

[3] Made by Velsicol Corp., Chicago, Ill., and other companies.

Assuming that the above conditions are met, the particular solvent to be used will be selected on the basis of (1) the desired rate of leachability or release of the herbicidal compound to the plant and/or soil; and (2) the particular herbicidally active ingredient used.

Insofar as the second factor is concerned, when any of the herbicidally active ingredients included in group I, supra, is used, preferred solvents will include polyhydric alcohols, glycol ethers and ketones, the former being the most commercially effective of the three solvent classes listed.

Suitable polyhydric alcohols include glycol and glycerine as well as the higher molecular weight polyethylene and polypropylene glycols soluble in water. Examples of polyethylene glycols are the "Carbowaxes" manufactured by the Carbide and Carbon Chemicals Co., 30 E. 42nd Street, New York 17, N.Y. Those "Carbowaxes" may be used which have numbers of from 600 to 6,000 with average molecular weights of from 570 to 7,500 and viscosities in centistokes at 210° F. of from 10.5 to 900. Examples of other polyhydric alcohols which may be used with equally good results are ethylene, propylene, dipropylene, triethylene and hexylene glycols; 2,2-diethyl-1,3 propanediol; 2-ethyl-2-butyl-1,3-propanediol; 1,5 pentanediol; 2-ethyl-1,3-hexanediol; as well as polyethylene and polypropylene glycols.

Preferred glycol ethers are ethylene glycol monoethyl ether; ethylene glycol monomethyl ether; ethylene glycol monobutyl ether; 1-butoxyethoxy-2-propanol; diethylene glycol monoethyl ether; diethylene glycol monomethyl ether; diethylene glycol monobutyl ether; methoxytriglycol; and ethoxytriglycol.

Among the ketones which may be used are acetone, methyl ethyl ketone and diisobutylketone.

When the herbicidally active ingredient is chosen from those included in group II, supra, the preferred solvent is an aliphatic or aromatic hydrocarbon boiling within a range of from 300° to 600° F. The preferred solvents for this group are low molecular weight petroleum naphthas within a boiling range of 310° to 595° F. with a low aromatic content of 15% by weight or less. These solvents are generally referred to as mineral spirits and include, for example, Stoddard Solvent, mineral seal oil, kerosene and heavy naphtha.

In cases where the herbicidal compound is insoluble or difficult to dissolve in the ultimately desired solvent, it may be first dissolved in a proportionately small quantity of an intermediate solvent such as a low molecular weight aliphatic hydrocarbon and this solution mixed with the ultimately desired solvent. If an emulsion is formed, a suitable emulsifying agent of the types such as alkyl aryl sulfonates and their sodium salts, polyglycol esters of long chain organic acids, polyoxyethylated oils, and polyhydric alcohol esters, may be added to stabilize the emulsion.

With all the above herbicides and solvents, the carrier material for the herbicidal compound of the instant invention is granular, finely divided expanded vermiculite. No. 4 vermiculite sold by the Zonolite Company of Chicago, Ill., has been found to give good results. This No. 4 expanded vermiculite has an average particle size of 420 microns, 95% of which are larger than 210 microns in diameter. Other sizes of vermiculite which vary in mesh sizes of from 16 to 100 may be used with good results, although vermiculite having a mesh size of −20+75 (U.S. Standard Sieve) is preferred. The sizes of vermiculite are based on fractions passing through a given U.S. Standard Sieve and retained on a second sieve of smaller mesh size.

The particular ratios of ingredients used in the formulations of the instant invention are dependent upon a variety of factors and will necessarily vary depending upon the formulation employed. For example, since a prime purpose of the solvent is to serve as a vehicle to transport the herbicidally active ingredient to and to effect its adsorption on the vermiculite carrier, less solvent will be required where the herbicidally active ingredient is in liquid form in the first instance (i.e., such as is the case where chlordane is the active herbicidal ingredient). Secondly, since, as aforesaid, the toxicity of the solvent must be maintained at a minimum lest the toxic selectivity of the formulation be impaired, this imposes an additional limitation upon the total permissible quantity of solvent. Still another factor is the solubility characteristics of the herbicidally active ingredient in the particular solvent used.

In general, and bearing in mind the above mentioned factors, it may be said that the quantity of solvent used should be at least sufficient to dissolve the herbicidally active ingredient at a temperature below its decomposition point but not so great as to impair the toxic selectivity of the formulation. The quantity of herbicidal ingredient should be sufficient to be toxic to the plant growths which it is desired to eradicate. The combined and relative quantities of solvent and herbicidal ingredient should be such that substantially all of the herbicidal ingredient will be bonded by adsorption to the platelets of the vermiculite.

Using the above parameters as guides and with the application of known techniques, those skilled in the art will have no difficulty choosing correct proportions of ingredients.

In the following table, by way of example, is listed typical formulations, based upon the herbicidally active ingredient used, showing preferred proportions of materials. Since these proportions may vary depending upon the variety of factors set forth above, however, they should not be deemed restrictive, but illustrative only.

TABLE A

| Herbicidal Compound | Parts by Weight | | |
|---|---|---|---|
| | Herbicidal Compound | Solvent | Vermiculite |
| phenylmercuric and compounds | 3-10 (preferred 5-7) | 60-90 (preferred 70-75) | 400-500 (preferred 450-475) |
| TBA | 5-40 | 60-90 | 400-500 |
| Endothal | 2-20 | 60-90 | 400-500 |
| Haloaryloxyacetic acid and compounds | 5-30 (.02-5% by wt.) | 60-90 | 400-600 |
| IPC | 2-20 | 60-90 | 400-500 |
| CIPC | 2-20 | 60-90 | 400-500 |
| 2,4,6-trichlorobenzoic acid and compounds | 5-30 | 60-90 | 400-500 |
| trichloroacetic acid | 2-20 | 60-90 | 400-500 |
| 2-2,dichloropropionic acid | 2-20 | 60-90 | 400-500 |
| chlordane | 20-110 | 5-30 | 200-300 |
| Neburon | 2-10 | 60-90 | 400-500 |
| pentachlorophenol | 5-30 | 60-90 | 400-500 |
| hexachloroacetone | 5-30 | 60-90 | 400-500 |
| 2,3,6-trichlorophenyl-acetic acid | 5-30 | 60-90 | 400-500 |

It is also possible to use a combination of active ingredients. For example, in clover control for lawns, it is desirable to limit 2,4-dichlorophenoxy acetic acid to not more than 25% by weight of the total active ingredients used when it is combined with 2,4,5-trichlorophenoxyacetic acid, which is used in the formulation in order to make the composition more effective for broadleaf weed control in general.

To impart desirable color to the product and the turf, water-soluble dyes such as malachite green, auramine, oil soluble orange and crystal violet may be used without impairing the effectiveness and with some possible improvement in phytocidal and fungicidal results. The amount of dye used is generally 2 to 6 parts by weight.[4]

It has also been discovered that, especially in pre-emergence weed control work, the addition of about 1

---
[4] This range is based upon the proportions of ingredients heretofore set forth.

to 5 parts by weight[4] of "Alanap-1" N-1-naphthylphthalamic acid produced by the Naugatuck Chemical Company) to herbicidal compositions containing a phenylmercuric compound as the herbicidally active ingredient increased the effectiveness of pre-emergence crabgrass control, but did not alter the selective characteristics when used either as a pre-emergence or post-emergence crabgrass control treatment.

Furthermore, as will hereinafter be shown, the results obtained by such addition are unexpectedly synergistic, even when the addition is made to a phenylmercuric compound which is ultimately absorbed in a carrier material other than expanded vermiculite (though, of course, the phenylmercuric adsorbed on vermiculite is preferred, for the reasons heretofore set forth).

[For a detailed description of N-1-naphthyl phthalamic acid, reference should be made to United States Patent 2,556,665, issued June 12, 1951.]

Further, it has been found that the addition of from about 0.75 to 30 parts by weight[5] of a wetting agent extended the effectiveness of the phenylmercuric formulations so that approximately one-half of the previously used amount of phenylmercuric produced satisfactory control (less than 0.75 part by weight would be relatively ineffective and more than 30 parts by weight would result in turf injury). This is not only true in pre-emergence weed control treatment, but also in post-emergence crabgrass control.

A preferred wetting agent is "Ultrawet-K-Dense" (produced by the Atlantic Refining Company), an alkyl benzene sodium sulfonate with the alkyl group having about 1 to 15 carbon atoms. While this wetting agent is an anionic surface active agent, nonionic and cationic surface active agents may also be used, though the former have given better results. A suitable concentration of wetting agent (percent active) is 85%.

Surface active agents are of course well known in the art. For a description and a comprehensive list of surface active agents available, reference should be had to "Synthetic Detergents: The Boom Won't Wash Out," reprinted from Chemical Week, copyright, 1955, by McGraw-Hill Publishing Company, Inc., 330 West 42nd Street, New York 36, New York. Another reference is "Surface Active Agents, Their Chemistry and Technology," by Schwartz and Perry, published by Interscience Publishers Inc., 1949.

While it is not essential, it is highly desirable that all materials used in the formulation be pure in order to prevent side reactions, to maintain effective control and to obtain reproducible results.

In practicing the invention, the herbicidally active compound is first added to the solvent, which may be heated to speed dissolution of the herbicidal compound and, incidentally, to reduce the viscosity of the solvent. Specific temperatures to which the solvent should be heated to accomplish the above results will necessarily vary depending upon the herbicidal compound and solvent used and may readily be determined by conventional laboratory techniques. For example, when phenylmercurics and a polyhydric alcohol are used, the minimum temperature of effective dissolution is 40° C., with a preferred range of 40°–60° C. Where a haloaryloxy substituted aliphatic acid is used, the temperature of the solvent should be 60° to 140° C. in the case of the higher molecular weight polyhydric alcohols; heating of the lower molecular weight alcohols such as triethylene glycol is not necessary.

The solvent should not, in any event, be heated to temperatures at which decomposition of the herbicidal compound (and dye when it is used) is apt to take place. Again, this maximum temperature is dependent upon materials used, it being approximately 140° C. in the case of a phenylmercuric-polyhydric alcohol mixture.

The vermiculite may also be heated to a temperature not to exceed the maximum temperature to which the solvent will be heated before being sprayed with the herbicidal-solvent solution, but this step is not necessary. The herbicidal compound solubilized in the solvent enables the herbicide to adsorptively bond with the vermiculite. The extent of bonding of ions to the vermiculite depends upon factors such as the concentration of the solution, exposed surface areas, temperature, etc.

The resulting solution is then sprayed onto finely divided expanded vermiculite in an amount sufficient to provide at least the toxic concentration of herbicidal compound necessary for control of the noxious weed. The coated vermiculite is then thoroughly mixed to obtain a homogeneous-appearing mass, after which the mixture is cooled and subsequently packaged.

The following examples will serve to illustrate the invention:

*Example I*

6.0 lbs. technical grade phenylmercuric acetate (10% moisture) was added with stirring to 73 lbs. of polyethylene glycol-600 which was at a temperature of 80° C. Complete dissolution was effected in two minutes. The solution was allowed to cool to 50° C. and sprayed onto 450 lbs. of 60-mesh expanded vermiculite and then mixed for about 5 minutes in a ribbon blender.

The above formulation proved to be extremely effective as a post-emergence crabgrass control, as indicated by the following: the material was slightly aerated and applied in the evening to a lawn by spreading in an amount of about 4.5 lbs. per 1000 square feet on three separate occasions, at five-day intervals. At the end of three weeks 85% of the crabgrass had died and new, green spikes of young turf grass had appeared.

*Example II*

| | |
|---|---|
| Vermiculite (No. 4)_____ft³__ | 41.0 |
| Hexylene glycol_____lbs__ | 17.0 |
| Propylene glycol butyl ether ester of 2,4,5-trichlorophenoxy acetic acid (42.5% acid equivalent) lbs__ | 30.0 |
| Du Pont oil orange_____lbs__ | 1.5 |

Using the above formulation, the hexylene glycol was placed in a mixing tank and heated to a temperature of about 40° C. and the herbicidal ester and orange dye were added thereto. These ingredients were mixed for about 1½ to 2 minutes until a good solution was obtained. This solution was sprayed over a 2 minute interval onto the vermiculite which was in a ribbon blender, the blender being in operation during the spraying operation. Mixing was continued for about one minute. The finished free-flowing substantially dust-free herbicidal composition had a volume of approximately 45 cubic feet and was 1.7% active. A convenient method for varying the concentration of active ingredients in the final product is to vary the amount of vermiculite which is treated with the herbicidal solution.

*Example III*

| | Lbs. |
|---|---|
| Vermiculite (No. 4)_____ | 1080 |
| Chlordane _____ | 290 |
| Stoddard solvent_____ | 75 |
| Red dye_____ | 2 |

Using the above formulation, the dye is first dissolved in the Stoddard Solvent and the chlordane added while stirring for a sufficient time to thoroughly mix the ingredients. After mixing, the solution is heated and held within the range of 90° to 100° F. to decrease viscosity and improve adherence to the granular vermiculite. The heated solution is then sprayed onto the vermiculite while being agitated in a ribbon blender.

The above formulation proved to be extremely effective as a pre-emergence crabgrass control and did not injure or adversely affect turf grasses such as colonial ---
[6] See footnote 4.

bentgrass (*Agrostis tenuis*), Kentucky bluegrass (*Poa pratenses*), creeping red fescue (*Festuca rubra*) and Bermuda (*Cynodon dactylon*) when applied at more than double the rate required for pre-emergence crabgrass control.

*Example IV*

| | | |
|---|---|---|
| No. 4 vermiculite | cu.ft. | 50-51 |
| Hexylene glycol 60°-65° C | lbs. | 34.0 |
| Phenylmercuric acetate (or 3 lbs. 1.5 oz. phenylmercuric propionate) | lbs. | 3.0 |
| Propionic acid 98% | ml. | 125.0 |
| 28% ammonium hydroxide | ml. | 400.0 |
| Dye: 80% malachite, 20% Auramine O | oz. | 26.0 |
| "Alanap-1" | oz. | 30.0 |
| "Ultrawet-K-Dense" | lbs. | 3.0 |

The chemical ingredients were added to the hexylene glycol at 60°-65° C. in the order given. The phenylmercuric compound was thoroughly dispersed in the hexylene glycol during approximately a 1 minute period. The propionic acid was then added. After approximately thirty seconds the ammonium hydroxide was added in order to complete solubilization. Approximately thirty seconds after the addition of the dye, the "Alanap-1" and "Ultrawet-K-Dense" (which formed a suspension) were added in combination.

The resulting solution and suspension was sprayed on the vermiculite over 1½-2 minute intervals while blending the mixture so as to provide a uniform coating. The resulting composition was then mixed for an additional 1-2 minutes. The final batch volume was approximately 45 cu. ft.

The resulting composition was extremely effective as a pre-emergence crabgrass control.

As heretofore indicated, the addition of relatively low concentrations of N-1-naphthyl phthalamic acid (Alanap-1) to phenylmercuric compounds adsorbed on expanded vermiculite results in significant synergistic increases in the effectiveness in pre-emergence crabgrass control of the combination in comparison to that achieved by the use of phenylmercuric compounds alone. Such synergism is demonstrated by the results set forth in Table B, in which one treatment was applied to crabgrass (*Digitaria sanguinalis*), seeded in pots of soil, 3 days after seeding at the rate of 5 pounds per 1000 sq. ft. In this test the composition of the phenylmercuric compounds was identical except for the addition of "Alanap-1" to the second compound.

TABLE B

| | Percent Control | Percent Green Weight |
|---|---|---|
| 0.37% Phenylmercuric Acetate | 23 | 9.63 |
| 0.22% "ALANAP-1" | 16 | 16.06 |
| 0.37% Phenylmercuric Acetate+0.22% "ALANAP-1" | 69 | 2.85 |

Percent Control—Percent of germinating plants controlled on basis of germination in check pots.
Percent Green Weight—Percent of green weight of crabgrass foliage growth on basis of green weight of foliage in the check pots.

The percent control demonstrates synergism between the phenylmercuric and N-1-naphthyl phthalamic acid. Growth in the combination treatment is only 2.85% of that in the check. Growth in the separate phenylmercuric treatment is more than 3 times as great and in the "Alanap" treatment more than 5 times as great as in the combination treatment. This is an important aspect in the pre-emergence treatment series in which repeat treatments will either kill or further inhibit the affected plants which develop from seeds not controlled in the process of germinating.

In addition to being useful as herbicides, the phenylmercurics are also effective as fungicides, though the synergism observed in their use as herbicides does not take place in such use. For this reason, it serves no useful purpose to add the N-1-naphthyl phthalamic acid to the formulation which, except for the deletion of the "Alanap-1," may be as set forth in Example IV above.

The reason the herbicidal and solvent materials of the instant invention are adsorbed on the surfaces of vermiculite particles may be explained by the chemical and physical structure of the vermiculite itself. Vermiculite ore is a micaceous mineral that exfoliates when heated or subjected to certain chemical reactions. It is a hydrated magnesium-aluminum-iron silicate of monoclinic crystal structure with pseudo-hexagonal characteristics and possesses a Moh's scale hardness of 1.5. The chemical composition of ore and expanded vermiculite are identical except for $H_2O$ content. The purpose of expanding vermiculite is to enlarge or increase its porosity or the cellular condition of its laminae.

The platelet-type of laminar structure of vermiculite is directly responsible for the unique surface area and void volume characteristics which appear to be in turn responsible for the physical and chemical properties of the material that cause the solvents to be adsorbed thereon and thereby yield new and unexpectedly improved results in dust-free toxic herbicides. The individual elementary vermiculite platelets are approximately 9.3 A. thick (27,000,000 platelets would produce a stack one inch high). It has been found that the individual platelets are composed of two silica tetrahedral sheets bonded to a central sheet of di-valent ions (primarily $Mg^{++}$) in octahedral configuration, and carry net negative charges due to partial substitution of trivalent aluminum ions for tetravalent silicon ions in the tetrahedral sheets (Grimm, R. E., Clay Mineralogy, pp. 76-77, McGraw-Hill, 1953). These negative charges, carried by the individual platelets, are balanced by the presence of positively charged cations such as $Mg^{++}$, $Ca^{++}$ and $K^+$ which occupy positions between the platelets. These interplatelet ions are relatively loosely held and may be removed and replaced stoichiometrically by other ions without altering the composition of structure of the platelets. The ion (base) exchange capacity exhibited by vermiculite arises from this source, and makes possible adsorption bonding with both organic and inorganic cations. The cation exchange capacity, determined by treating the vermiculite with neutral ammonium acetate and then analyzing the thoroughly washed samples for nitrogen, was found to be in the order of 19.4 to 22.5 milli-equivalents for 100 grams.

Studies have shown that the herbicides adsorbed on the surfaces of the vermiculite are very resistant to leaching by water. The resistance of the herbicidal compound to leaching by water varies with the compound. However, all of the adsorbed herbicidal compounds are retained much longer on the vermiculite than when adsorbed in the conventional carriers.

Materials such as talc, fuller's earth, kieselguhr, diatomaceous earth, volcanic sand, pumice, chalk, woodflower, nutshell flower, charcoal, inorganic phosphates, magnesium carbonates, bentonite and pyrophyllites have all been used heretofore as carriers for herbicides in dust formulations. However, these materials usually have a size in the order of from 2 to 40 microns in diameter (with the average size being from 6 to 8 microns) and therefore are prone to release dust when applied. Some of the above materials such as talc and fuller's earth have also been found to adsorb polyhydric alcohols and aliphatic and aromatic hydrocarbons; however, none of these materials will retain such vehicles and active herbicide ingredients to the desirable degree to which they are retained by vermiculite and still provide a dry, dust-free, lighter weight, free-flowing, granular composition. Prior dry herbicides made with these carriers have not been dust-free nor long acting, and have had the problems and shortcomings of prior dry fomulations discussed above.

In an effort to determine the processes or mechanics of herbicidal retention of the herbicidal compositions by vermiculite, numerous leaching studies were conducted. For example, when samples of a phenylmercuric-polyhydric alcohol-vermiculite formulation were leached with more than four times the amount of water ordinarily required to completely dissolve the amount of phenylmercuric compound combined in the composition, it was possible to extract not more than approximately 20% to 40% of the total phenylmercuric content. Such leachings were the result of a single dissolution interval of 20 to 30 minutes with subsequent filtering of the solution from the vermiculite composition. These results indicate that the phenylmercuric was tightly held by the vermiculite particles against the solvent and mechanical washing action of water. Also, it was found that repeated leachings yielded additional quantities of the phenylmercuric indicating that it would be available as a toxicant over an extended period of time.

Further data obtained in leaching studies of the phenylmercuric radical combined with vermiculite indicate that an equilibrium concentration develops between the phenylmercuric radical on the vermiculite platelet and in solution with the leaching water. The addition of cations and chelating substances in the leaching water shifts the equilibrium in favor of the solution, probably by causing exchange of the cation with the phenylmercuric ion bonded on the vermiculite and by the greater force of attraction of chelating substances for the phenylmercuric ion. Studies with extracts of crabgrass and other plants indicated that these substances facilitate the leaching of phenylmercuric combinations when added to the leaching water. This would indicate that the plant in itself may contribute to the release of the phenylmercuric radical from the vermiculite.

The dry free-flowing substantially dust-free formulations of this invention are easily spread onto and retained by the wide leaf and growth of the undesirable weeds and yet are not retained by the turf grasses. The term "weed" as used herein is defined as a plant out of place; thus if clover is not wanted in a lawn, it is classified as a weed. The compositions in the form disclosed herein remain in contact with the plant for substantial periods of time, thereby resulting in the maintenance of a high level of toxic material in intimate association with the plant to furnish the necessary killing action. With the use of the new and novel compositions of this invention the effectiveness of herbicidal compounds has been greatly increased, as compared to dusts or sprays, without serious damage to the surrounding turf grasses.

Furthermore, the present formulations are relatively non-hazardous due to the low concentration of herbicidal compounds and the physical and chemical characteristics of the granular vermiculite carrier. They accordingly lend themselves readily to treatment of undesirable plant growths by home owners without the need for protective clothing and careful precautions in application.

As aforeindicated, this application is a continuation-in-part of several of applicant's copending applications. While much of the material set forth in the specifications of those applications has been expressly incorporated in this application, portions of those specifications have been omitted, for the sake of clarity and succinctness. It is to be understood, however, that everything disclosed in those applications, insofar as germane to the instant disclosure, is hereby incorporated by reference into this application.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A free-flowing, granular, substantially dust-free composition of matter comprising a carrier of finely divided expanded vermiculite particles substantially all of which are greater than 150 microns in size; a low volatile vehicle and a pesticide which is substantially entirely soluble in said vehicle, said pesticide and vehicle being adsorbed on the surfaces of said vermiculite to the substantial exclusion of absorbed pesticide, with said pesticide present in a toxic amount; said pesticide being releasable from said vermiculite carrier by moisture.

2. The composition of claim 1 wherein said pesticide is at least one member of the group consisting of chlordane, [1-n-butyl-3 - (3,4-dichlorophenyl)-1-methylurea], pentachlorophenol, hexachloroacetone and the phytocidal esters of haloaryloxy-substituted aliphatic acids.

3. The composition of claim 2 wherein said vehicle is selected from the group consisting of petroleum fractions having a boiling range of approximately 300° to 600° F.

4. The composition of claim 3 wherein said vehicle is a low molecular weight petroleum naphtha within a boiling range of 310° to 595° F., with a low aromatic content of no more than 15% by weight of said vehicle.

5. The composition of claim 1 wherein said pesticide is at least one member of the group consisting of phenylmercuric compounds, haloaryloxy-substituted aliphatic acids, [disodium-3, 6-endoxohexahydrophthalic acid], isopropyl phenylcarbamate, chloroisopropyl phenylcarbamate, [2,4,6-trichlorobenzoic acid], trichloroacetic acid, [2,2-dichloropropionic acid] and [2,4,5-trichlorophenylacetic acid].

6. The composition of claim 5 wherein said vehicle is selected from the group of substantially water soluble organic vehicles consisting of polyhydric alcohols, lower aliphatic glycol ethers and aliphatic ketones.

7. The composition of claim 1 wherein said vehicle is selected from the group consisting of petroleum fractions having a boiling range of approximately 300° to 600° F.

8. The composition of claim 1 wherein said vehicle is selected from the group of substantially water soluble organic vehicles consisting of polyhydric alcohols, lower aliphatic glycol ethers and aliphatic ketones.

9. The composition of claim 1 additionally comprising a surface active agent in an amount sufficient to increase the phytocidal effectiveness of said pesticide.

10. A free-flowing, granular, substantially dust-free composition of matter comprising a carrier of finely divided expanded vermiculite particles having a platelet structure, substantially all of which particles are greater than 150 microns in size; a low volatile organic vehicle; and a pesticide which is substantially entirely soluble in said vehicle, substantially all of said pesticide and vehicle being adhered as a thin layer on said platelet surfaces of said vermiculite particles, with said pesticide present in a toxic amount; said pesticide being releasable from said vermiculite carrier by moisture.

11. A free-flowing, granular, substantially dust-free composition of matter comprising a carrier of finely divided expanded vermiculite particles substantially all of which are greater in size than 100 mesh U.S. Sieve; a liquid pesticide adsorbed on the surfaces of said vermiculite particles to the substantial exclusion of absorbed pesticide, in a toxic amount; said pesticide being releasable from said carrier by moisture.

12. The composition of claim 11 additionally comprising a surface active agent in an amount sufficient to increase the phytocidal effectiveness of said pesticide.

13. The composition of claim 11 wherein said pesticide is at least one member of the group consisting of chlordane, [1-n-butyl-3-(3,4-dichlorophenyl) - 1 -methylurea], pentachlorophenol, hexachloroacetone and the phytocidal esters of haloaryloxy-substituted aliphatic acids.

14. The composition of claim 11 wherein said pesticide is at least one member of the group consisting of phenylmercuric compounds, haloaryloxy-substituted aliphatic acids, [disodium-3,6-endoxohexahydrophthalic acid], isopropyl phenylcarbamate, chloroisopropyl phenylcarbamate, [2,4,6-trichlorobenzoic acid], trichloroacetic acid, [2,2-dichloropropionic acid] and [2,4,5-trichlorophenylacetic acid].

15. The composition of claim 11 wherein said pesticide is a phenylmercuric compound and further comprising N-1-naphthyl phthalamic acid in an amount at least sufficient to increase the pesticidal effectiveness of said phenylmercuric compound.

16. A method of destroying noxious weeds comprising applying to said weeds a sufficient quantity to be toxic to said weeds of a free-flowing, granular, substantially dust-free composition of matter comprising a carrier of finely divided expanded vermiculite particles substantially all of which are greater than 150 microns in size, with a pesticide adsorbed on the surfaces of said vermiculite particles, to the substantial exclusion of absorbed pesticide, said pesticide being present in an amount sufficient to be toxic to said weeds, said pesticide being releasable from said vermiculite particles by moisture after it has been applied to said weeds.

17. A method of destroying noxious weeds comprising applying to said weeds a sufficient quantity to be toxic to said weeds of a free-flowing, granular, substantially dust-free composition of matter comprising a carrier of finely divided expanded vermiculite particles substantially all of which are greater than 150 microns in size, a low volatile organic vehicle; and a pesticide which is substantially entirely soluble in said vehicle, said vehicle and pesticide being adhered as a thin film on said vermiculite particle surfaces with said pesticide present in an amount sufficient to be toxic to said weeds, said pesticide being releasable from said carrier by moisture.

18. A method of making a free-flowing, granular, substantially dust-free pesticide composition of matter comprising the steps of: dissolving a pesticide in a low volatile vehicle, and dispersing the resulting solution uniformly over expanded vermiculite particles substantially all of which are greater than 150 microns in diameter, said pesticide compound being applied to said vermiculite particles in an amount sufficient to be toxic to selected plants and being releasable from said vermiculite by moisture, the relative quantities of the ingredients being such that said pesticide is substantially adsorbed on the surfaces of said vermiculite particles to the substantial exclusion of absorbed pesticide.

19. A composition of matter comprising as essential ingredients a granular, finely divided expanded vermiculite carrier having a platelet structure, substantially all of said vermiculite being greater than 150 microns in size; phenylmercuric acetate; a polyhydric alcohol vehicle for said phenylmercuric acetate, and N-1-naphthyl phthalamic acid in an amount at least sufficient to increase the effectiveness of said phenylmercuric acetate, said phenylmercuric acetate being bonded substantially by adsorption to the platelets of the vermiculite.

References Cited in the file of this patent
UNITED STATES PATENTS

| | | |
|---|---|---|
| 1,972,390 | Miner | Sept. 4, 1934 |
| 2,317,765 | Hester | Apr. 27, 1943 |
| 2,394,916 | Jones | Feb. 12, 1946 |
| 2,403,435 | Hammer | July 9, 1946 |
| 2,416,259 | Kagy | Feb. 18, 1947 |
| 2,642,354 | Barrons | June 16, 1953 |
| 2,875,119 | Trademan et al. | Feb. 24, 1959 |
| 2,875,120 | Trademan et al. | Feb. 24, 1959 |

Disclaimer 3,083,089.—*Victor A. Renner*, Marysville, Ohio. GRANULAR HERBICIDAL COMPOSITION AND METHOD. Patent dated Mar. 26, 1963. Disclaimer filed May 2, 1963, by the assignee, *The O. M. Scott & Sons Company*.

Hereby disclaims the terminal portion of the term of said patent extending from Feb. 6, 1980, through Mar. 26, 1980, both dates being inclusive.

[*Official Gazette July 23, 1963.*]